(12) United States Patent
Eckert et al.

(10) Patent No.: US 7,409,292 B2
(45) Date of Patent: Aug. 5, 2008

(54) METHOD AND SYSTEM FOR DEGIMBALIZATION OF VEHICLE NAVIGATION DATA

(75) Inventors: Charles P. Eckert, Palm Harbor, FL (US); Reed R. May, Seminole, FL (US); Maurice A. Shrader-Frechette, Temple Terrace, FL (US); Delroy J. Sowada, Seminole, FL (US); Michael G. Symonds, Saint Petersburg, FL (US); Michael O. Vaujin, Oldsmar, FL (US); Jeff S. Willis, Dunedn, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/441,907

(22) Filed: May 26, 2006

(65) Prior Publication Data

US 2007/0288165 A1    Dec. 13, 2007

(51) Int. Cl.
  *G01C 21/30*    (2006.01)

(52) U.S. Cl. .................. 701/220; 244/3.2; 244/171
(58) Field of Classification Search .................. 701/200, 701/210, 220; 244/3.2, 171
See application file for complete search history.

(56) References Cited

U.S. PATENT DOCUMENTS

| | | | | |
|---|---|---|---|---|
| 4,396,878 A | * | 8/1983 | Cole et al. | 318/648 |
| 4,608,641 A | * | 8/1986 | Snell | 701/4 |
| 6,122,595 A | * | 9/2000 | Varley et al. | 701/220 |
| 6,179,246 B1 | * | 1/2001 | Fisel et al. | 244/3.16 |
| 6,859,727 B2 | * | 2/2005 | Bye et al. | 701/210 |
| 6,863,244 B2 | * | 3/2005 | Fowell et al. | 244/171 |

* cited by examiner

*Primary Examiner*—Mark Hellner

(57) ABSTRACT

A method and system for degimbalization of sensor outputs is provided. Data output from an embedded GPS inertial navigation system (EGI), which is mounted within a gimbaled system on a vehicle, is processed to provide degimballed navigation data. Generally, motion of the EGI is due to the vehicle motion and the gimbal motion. To provide navigation information relating solely to the vehicle, effects of the gimbal motion within the EGI outputs can be removed.

19 Claims, 6 Drawing Sheets

METHOD AND SYSTEM FOR DEGIMBALIZATION OF VEHICLE NAVIGATION DATA

FIELD OF INVENTION

The present invention relates to velocity and position data frame of references, and more particularly, to removing effects of gimbal rotations from angular rate and attitude data.

BACKGROUND

Precision imaging systems, such as RADARs (radio detection and ranging), LIDARs (light detection and ranging), etc., are generally mounted on gimbals so that the detection device will remain suspended in a plane regardless of any motion of a vehicle on which the device sits. This allows the detection device to produce high resolution imagery that is not distorted due to the vehicle movements or accelerations.

In addition, the detection device usually requires accurate velocity data of the detection device for image stabilization purposes. Thus, such radar or lidar systems will have inertial sensors like gyroscopes and accelerometers mounted within the imaging system's gimbal assembly and next to the detection device of the imaging system to provide vehicle position and velocity data in the gimbal frame of reference. While this solves the need of the imaging system for accurate attitude data (e.g., position of aircraft or vehicle relative to a frame of reference—the horizon or direction of motion), velocity and position data at the detection device, this data does not reflect the actual vehicle attitude, velocity, or position since the inertial sensors are mounted on the gimbal. As a result, the vehicle typically has another set of accelerometers and gyroscopes that provide attitude, velocity and position data of the vehicle.

Of course, two sets of inertial sensors increases costs and complexity for imaging systems. It would be desirable to eliminate the need for a separate set of inertial sensors that provide vehicle attitude, angular rate data, velocity and position, and to acquire this data from the sensors mounted on the gimbal assembly.

SUMMARY

Within embodiments described below, a method for transforming gimbaled data output from an inertial sensor positioned on a gimbaled assembly within a moving vehicle into a frame of reference with respect to the moving vehicle is provided. The method includes receiving data from an inertial sensor mounted on a gimbal assembly that is positioned within a moving vehicle. Motion of the inertial sensor is due to motion of the gimbal assembly and motion of the moving vehicle, and thus data output from the inertial sensor reflects the motion of the gimbal assembly and the motion of the moving vehicle. The method further includes removing effects of the motion of the gimbal assembly from the data to produce data approximately reflecting motion of the moving vehicle.

In another embodiment, the method includes receiving data output from the inertial sensor positioned on the gimbaled assembly. The data reflects motion of the gimbaled assembly and motion of the moving vehicle. The method also includes receiving data output from an angular sensor that indicates an angular offset of the gimbaled assembly with respect to the moving vehicle and then synchronizing the data output from the inertial sensor and the data output from the angular sensor. The method further includes removing effects of the motion of the gimbaled assembly from the data output from the inertial sensor to produce data approximately reflecting motion of the moving vehicle.

In another respect, the embodiments may take the form of a radar assembly. The radar assembly includes a radar device mounted on a gimbaled assembly, an Embedded Global Positioning System/Inertial Navigation System (EGI) mounted on the gimbaled assembly, and a processor. The EGI provides data in a gimbaled frame of reference to the radar device, and the processor also receives the data in the gimbaled frame of reference and removes effects of gimbaled motion within the data.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

DETAILED DESCRIPTION

Precision imaging systems, such as RADARs (radio detection and ranging), LIDARs (light detection and ranging), etc., are used for high resolution ground mapping and imaging. One example radar system is the Synthetic Aperture Radar (SAR), which is used for environmental monitoring, earth-resource mapping, or other applications that require broad-area imaging at high resolutions.

Figure 1:
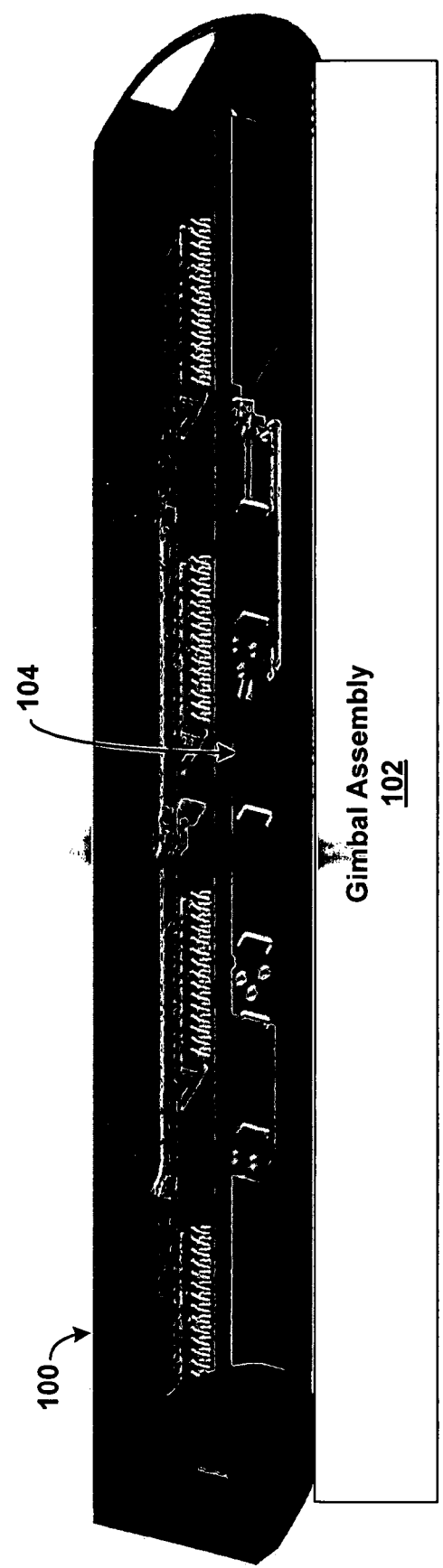
FIG. 1 illustrates one example of a Synthetic Aperture Radar (SAR) antenna.

FIG. 1 illustrates an example of a SAR antenna 100. The SAR antenna 100 is mounted on a gimbal assembly 102 so that the antenna 100 will remain suspended in a host vehicle, such as an aircraft like a plane, helicopter or blimp, a spacecraft or a ground vehicle, regardless of any motion of a vehicle on which the antenna 100 sits. This allows the antenna 100 to produce high resolution imagery that is not distorted due to the vehicle movements or accelerations. In this application, for example, the gimbal only provides roll axis control.

The SAR antenna 100 requires precise antenna velocity/position (relative to targets on the earth) over short periods of time for image stabilization purposes. Thus, an Embedded Global Positioning System (GPS)/Inertial Navigation System (INS) (referred to as an "EGI") 104 is mounted directly on the antenna gimbal assembly 102 to provide such data in the gimbal frame of reference to the antenna 100. The EGI 104 provides precision navigation information by integrating GPS satellite signals and INS data. The EGI 104 includes inertial sensors like gyroscopes and accelerometers to provide vehicle position and velocity data to the SAR antenna 100.

It should be noted that an INS that is not coupled with a GPS may also be mounted on the antenna gimbal assembly 102 to provide proper data to the antenna 100. Including GPS data, such as by employing an EGI on the assembly, may not be necessary in all applications. GPS data may be used, for example, as an accurate, stable, common time line to synchronize independent systems. Other techniques may be possible as well, however, GPS data satisfies needed accuracy. Furthermore, within embodiments disclosed below, only time data within the GPS data may be used. In other embodiments, position, velocity and time data may be used depending on specific applications of the antenna.

The EGI 104 thus provides accurate velocity, attitude and acceleration data of the phase center of the antenna relative to an Earth-based frame of reference (e.g., local-level) that is required for SAR processing. Such data does not reflect the vehicle attitude since the EGI 104 is mounted on the moving gimbal.

In an exemplary embodiment, data output from the EGI 104 is processed to provide actual vehicle navigation data (or data in the vehicle's frame of reference), thus eliminating the need for a separate set of inertial sensors that provide vehicle navigation data. The exemplary embodiments provide "degimbalized" velocity, attitude and acceleration of the vehicle (e.g., aircraft) relative to an Earth-based frame of reference-local-level frame that is required for common cockpit displays and flight controls.

Generally, motion of the EGI 104 is due to the aircraft motion and the gimbal motion, and thus outputs of the EGI 104 reflect the aircraft and gimbal motion. To provide navigation information relating solely to the aircraft, effects of the gimbal motion within the EGI outputs can be removed.

Figure 2:
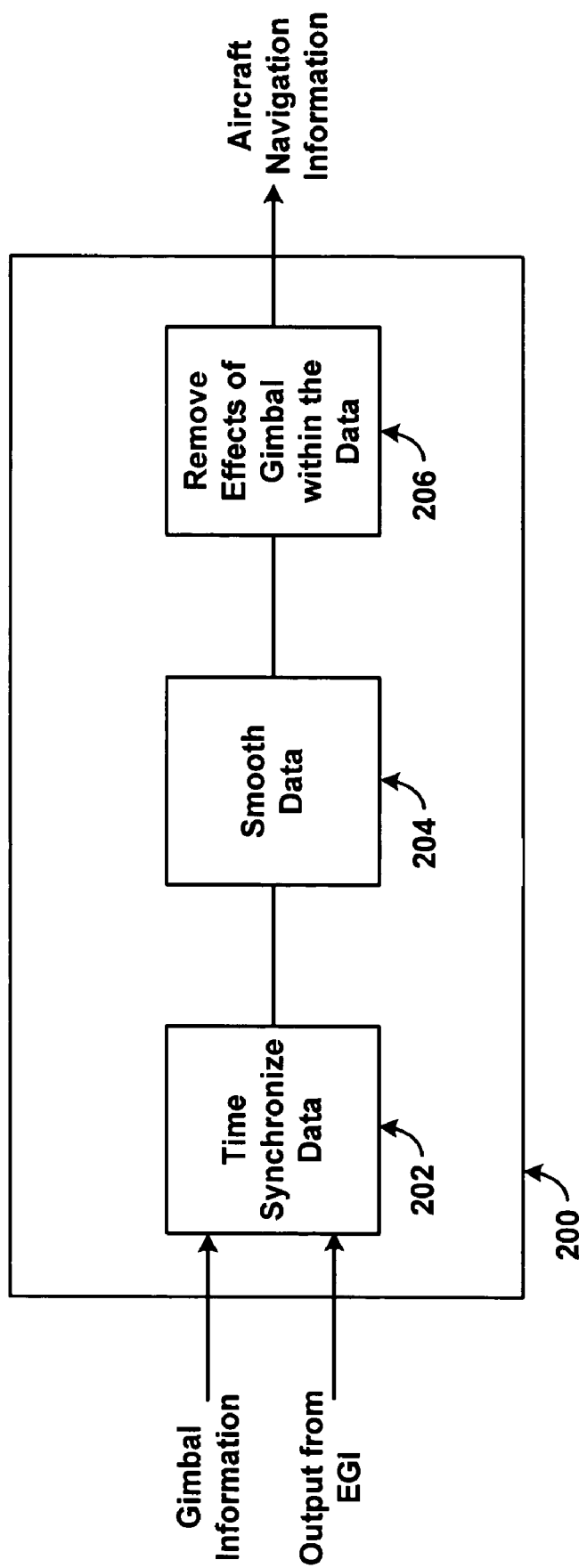
FIG. 2 illustrates one example of a processor for removing effects of gimbal motion within EGI outputs.

FIG. 2 illustrates a processor 200 for removing effects of gimbal motion within EGI outputs. The processor 200 may be positioned within the radar equipment, or the processor 200 may be separate from the radar and positioned within the vehicle. In this case, the processor is inside the EGI, for example. The processor 200 receives outputs from the EGI and information regarding the gimbal, such as specific angles of rotation of the gimbal with corresponding time tags. The EGI outputs also will have time tags. The processor 200 will time synchronize each set of data, and smooth the data. The data is smoothed to remove erroneous anomalies or spikes in the data. For example, signal noise due to vibration, chatter or other sources can be minimized to enhance the extrapolation operations required for accurate time synchronization.

The processor 200 will then remove the effects of the gimbal motion within the EGI outputs by subtracting out the gimbal reference angles. For example, the gimbal may be rotating at 30° per second, and the EGI may indicate a 35° per second rotation. The difference in rotation is due to the aircraft motion. Thus, removing the effects of the gimbal motion upon the EGI outputs would indicate that the aircraft is rotating at 5° per second, which is referred to as a degimbalized EGI output.

Exemplary embodiments described below combine (i) outputs of inertial instrumentation (e.g., the EGI), which is mounted on a rotating (with respect to the vehicle) imaging system, with (ii) outputs of angle sensors that indicate the angle between the imaging system and the vehicle body, in a manner so that the outputs of the inertial sensors are transformed into a frame of reference so as to appear as if the inertial sensors are mounted on the vehicle body. The two sets of outputs are combined using multiple curve-fitting and matched digital filtering to form an accurate, time-synchronized gimbal angle and gimbal angular rate values, which can then be used to transform the gimbal-referenced EGI attitude and angular rate data into high-rate vehicle-referenced attitude and rate data, thereby eliminating the need for a second INS or EGI unit to provide vehicle navigation data.

Figure 3:
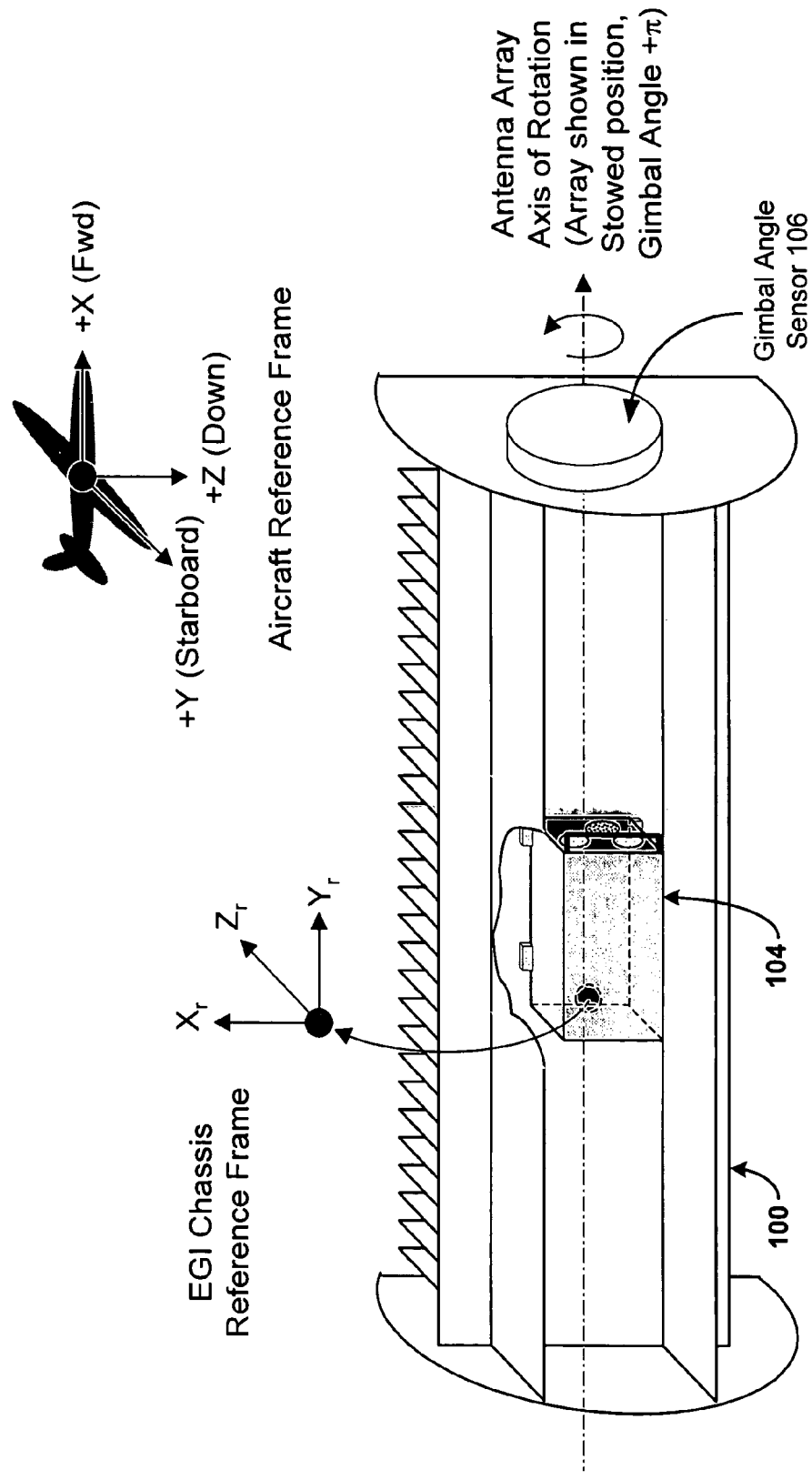
FIG. 3 conceptually illustrates one example of a relationship of reference frames of the EGI and a vehicle.

FIG. 3 conceptually illustrates a relationship of frames of reference of the EGI 104 and a vehicle. As shown, the antenna 100 will include a gimbal angle sensor 106 to indicate the angle between the antenna 100 and the vehicle to which the antenna 100 is attached. For example, the gimbal may rotate or sweep from left to right so that the antenna 100 can cover an entire area, and thus, the antenna will be offset in angular position to the vehicle with respect to a given axis. The gimbal angle sensor 106 will identify and output this angular offset to the processor 200.

Figure 4:
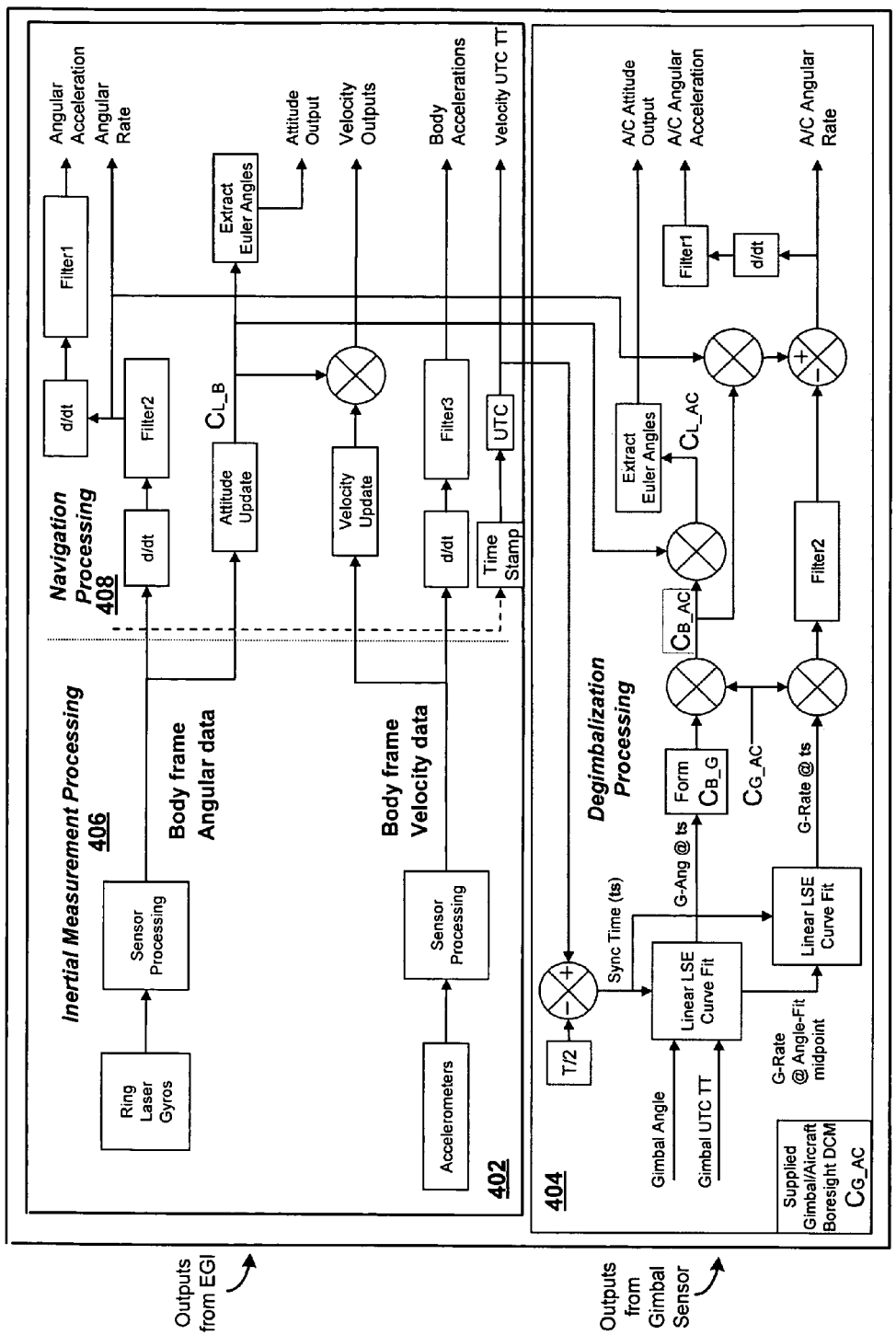
FIG. 4 is a block diagram of one example of a processor for removing effects of gimbal motion within EGI outputs.

FIG. 4 is a block diagram of one example of a processor 400 for removing effects of gimbal motion within EGI outputs. The processor 400 includes an EGI processor 402 and a gimbal processor 404. The processor 404 mainly time synchronizes data received from the gimbal angle sensor and the EGI, and translates motion from the EGI body reference frame to the vehicle reference frame. (Note that in one implementation the processor 400 including the EGI processor 402 and the gimbal processor 404 is located in an EGI).

The EGI processor 402 includes inertial measurement processing 406 and navigation processing 408. The inertial sensor processing 406 receives the outputs from the inertial sensor electronics (e.g., integrated velocity and angular position), and passes them to the navigation processing 408. The navigation processing system 408 extracts navigation information pertaining to the radar's frame of reference, including angular acceleration, angular rate, attitude, velocity, body accelerations, and Velocity UTC TT (Universal Time Coordinated Time Tag, which is the time that velocity was valid, expressed in UTC time—Greenwich Mean Time). Combined, the inertial measurement processing 406 and the navigation processing 408 may be an INS module that produces attitude and angular rate data with accurate UTC based time-of-validity data, for example.

The gimbal processor 404 receives outputs from the gimbal angle sensor. The outputs include the gimbal angle and its time-of-validity in Universal Time Coordinated (UTC), which allows accurate time alignment between the independent systems. The gimbal processor 404 also receives outputs from the EGI processor 402 and then transforms the EGI outputs into a frame of reference relative to the vehicle. The process of transforming the EGI outputs into a frame of reference relative to the vehicle is referred to herein as "degimbalization."

The time-tagged (TT) gimbal outputs are input to the gimbal processor 404 at a high rate. The gimbal angles are time-aligned to the current EGI by applying a linear Least Squares Curve fit to a short history of gimbal angle data and extrapolating the gimbal angle to the time-of-validity of current EGI data. Extrapolation provides an estimate of the gimbal angle that was present at the time that the EGI inertial angles were formed. A slope of the least squares curve fit provides a measurement of the gimbal angle rate with a time of validity at the center-point of the data set used for the fit. Next, a least squares curve fit is applied to a short history of the gimbal rate values to extrapolate a gimbal rate with a time-of-validity that matches the current EGI angular rate values.

Gimbal angle data is sampled, processed and sent to the gimbal processor 404 over a serial bus. Thus, a time-of-validity (TOV) for the gimbal data lags the current EGI data by some amount. In addition, the EGI processor 402 and the gimbal processor 404 are independent from each other, and thus a TOV alignment between the two processors can change over time. Small errors in TOV alignment can produce large difference errors when the gimbal angle is changing. However, using the least squares curve fit also provides a TOV alignment between the data sets.

Next, a series of direction cosine matrices (DCM) are constructed and used to transform data within one set of x,y,z axes to another set of x,y,z axes. Within the following description of the degimbalization process, the following acronyms are used:

C refers to "direction cosine matrix," (DCM) which refers to a mathematical transformation from one set of x,y,z axes to another set of x,y,z axes. In FIG. 4, the notation $C_{A\_B}$ indicates a DCM that transforms vectors from reference frame "B" into reference frame "A" as follows: $X_A = C_{A\_B} * X_B$ also $X_B = C_{A\_B}^T * X_A$ w superscript T indicates the transpose. That is: $C_{A\_B}^T = C_{B\_A}$. Within this notation the subscripts G, B and AC are defined as follows.

G refers to the gimbal's x,y,z coordinate system (X, Y, Z axes are chosen X=roll axis, Z=antenna pointing direction (ranging from zero to plus and minus 90 degrees relative to vehicle's down axis) and Y is chosen to make X Y Z right-handed ortho-normal).

B refers to the body x,y,z axes of the EGI.

AC refers to the aircraft's (or other vehicle's) x,y,z coordinate system (e.g., x out the nose, y out the right wing, and z out the belly).

Thus, using these definitions:

$C_{G\_AC}$ is the mathematical transformation that rotates the gimbal's x,y,z axes to coincide with the aircraft's x,y,z axes (e.g., relating the Gimbal reference frame to the AirCraft reference frame).

$C_{B\_AC}$ is the mathematical transformation that rotates the EGI body x,y,z axes to coincide with the aircraft's x,y,z axes (e.g., relating the EGI Body reference frame the AirCraft frame).

$C_{B\_G}$ is the mathematical transformation that rotates the EGI body x,y,z axes to coincide with the gimbal's x,y,x axes (e.g., relating the EGI Body reference frame to the Gimbal reference frame).

$C_{L\_B}$ is the mathematical transformation that rotates the local level navigation frame x,y,z axes (where x initially points north, y east and z down) to coincide with the EGI's body x,y,z axes (e.g., relating the Local level navigation frame to the Body frame).

$C_{L\_AC}$ is the mathematical transformation that rotates the local level navigation frame x,y,z axes (where x initially points north, y east and z down) to coincide with the aircraft's x,y,z axes (e.g., relating the Local level navigation frame to the AirCraft frame).

Initially, a boresight DCM ($C_{G\_AC}$) is computed prior to the degimbalization processing and input to the gimbal processor 404. The vehicle's roll, pitch, and yaw axes are conventionally X as forward, Y as right-wing, and Z as down (belly). For some gimbal pickoff angle, the antenna (or gimbal) and vehicle axes would coincide. That value is required to "boresight" the vehicle axes to the EGI. For example, the operational gimbal angle would be the gimbal pickoff angle minus the boresight angle. Thus, the boresight DCM relates the gimbal reference frame to the aircraft reference frame. The boresight DCM is defined at installation and formed by precision measurements of any misalignment of a gimbal roll axis and an aircraft roll axis.

Next, the gimbal's angular rotation (G-Ang) is used to form $C_{B\_G}$ to relate the EGI body reference frame to the gimbal reference frame.

Note that multiplying a vector by a DCM translates the vector from one reference frame into another reference frame, and multiplying DCMs together forms a new DCM that "chains" reference frame translations together. For example:

$$C_{B\_G} * C_{G\_AC} = C_{B\_AC}$$

In other words, multiplying the (i) mathematical transformation that rotates the EGI body x,y,z axes to coincide with the gimbal's x,y,x axes by the (i) mathematical transformation that rotates the gimbal's x,y,z axes to coincide with the aircraft's x,y,z axes gives: the mathematical transformation that rotates the EGI body x,y,z axes to coincide with the aircraft's x,y,z axes.

Consequently, combining the boresight DCM ($C_{G\_AC}$) and $C_{B\_G}$ as $C_{B\_G} * C_{G\_A} C_{B\_AC}$, as shown in the gimbal processor 404. Next, combining $C_{L\_B} * C_{B\_AC}$ produces $C_{L\_AC}$ from which Euler angles are extracted to determine the aircraft attitude (within the frame of reference of the aircraft).

Meanwhile, the gimbal rotational rate (G-Rate) is corrected for misalignment using the boresight DCM ($C_{G\_AC}$) as $[\text{Angular Rate}]_{AC} = C_{G\_AC}^T * [\text{Angular Rate}]_G$, digitally filtered (e.g., through a low-pass filter), and subtracted from the EGI rates to obtain the aircraft (AC) angular rate. Further filtering gives the aircraft angular acceleration. For example, after removing the gimbal effects from the data, formation of the AC angular acceleration using the G-Rate is the same as performed using the EGI processor 402, using back-differencing and low-pass filtering. (Filters within the EGI processor 402 and the gimbal processor 404 that have the same label, e.g., Filter1, Filter2, etc., perform the same filtering function.

Figure 5:
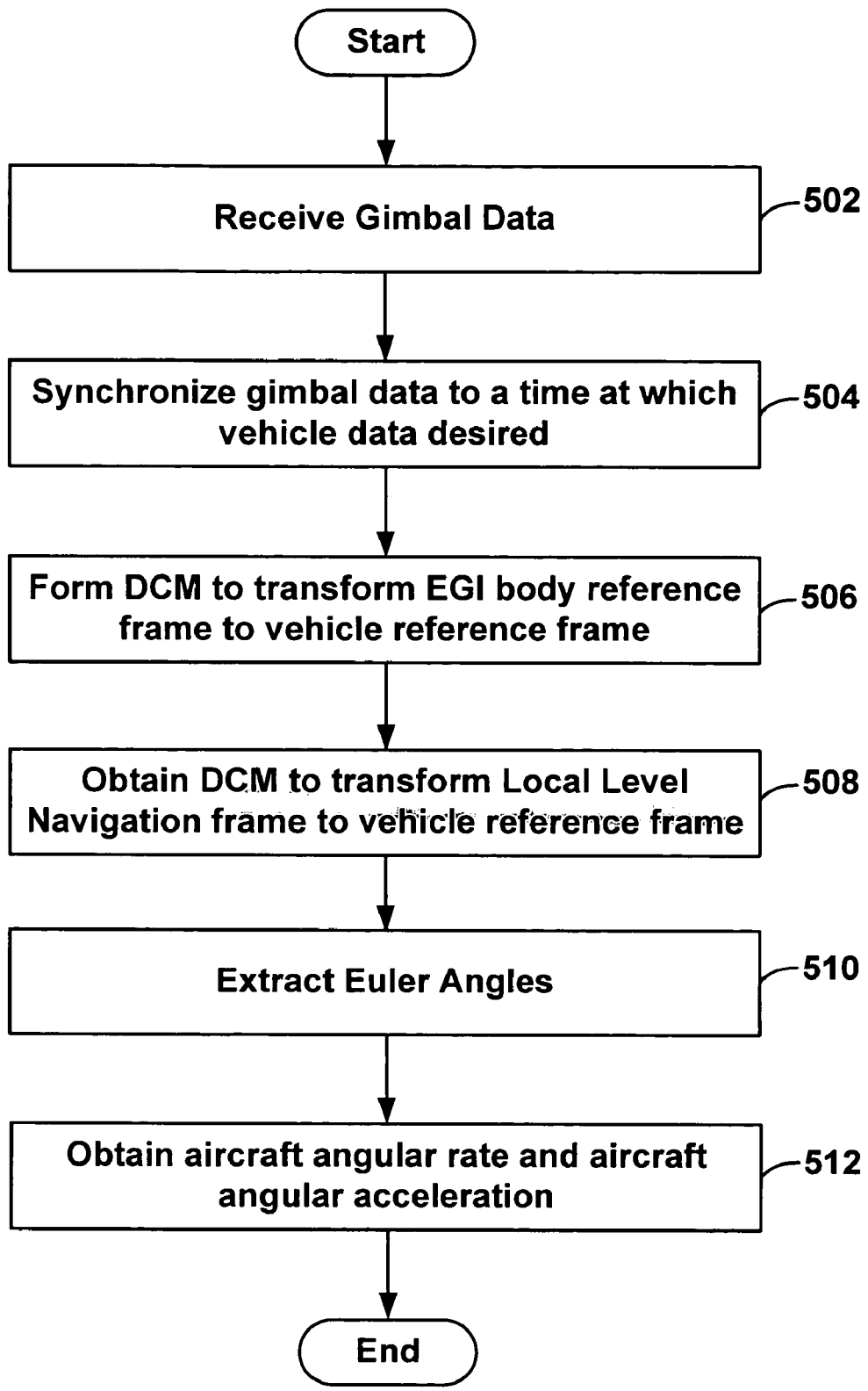
FIG. 5 is a flowchart depicting one example of functional steps for removing effects of gimbal motion within EGI outputs.

FIG. 5 is a flowchart depicting functional steps for removing effects of gimbal motion within EGI outputs. Initially, the gimbal processor 404 receives outputs from the gimbal angle sensor, as shown at block 502. Next, the gimbal data is synchronized to a time at which vehicle data are desired, as shown at block 504, to produce a gimbal rotational rate (G-Rate at ts) and gimbal rotational acceleration (G-Ang at ts).

Using mathematical transformations to transform data from one coordinate frame to another, the gimbal data is then used to transform the EGI data into the vehicle's frame of reference. First, using the (i) mathematical transformation that rotates the EGI body x,y,z axes to coincide with the gimbal's x,y,x axes and the (i) mathematical transformation that rotates the gimbal's x,y,z axes to coincide with the aircraft's x,y,z axes, the mathematical transformation that rotates the EGI body x,y,z axes to coincide with the aircraft's x,y,z axes is formed, as shown at block 506. Next, $C_{B\_AC}$ and $C_{L\_B}$ (mathematical transformation that rotates the local level navigation frame x,y,z axes to coincide with the EGI's body x,y,z axes) are combined to obtain $C_{L\_AC}$ (mathematical transformation that rotates the local level navigation frame x,y,z axes to coincide with the aircraft's x,y,z axes), as shown at block 508. Euler angles are then extracted to determine the aircraft attitude (within the frame of reference of the aircraft), as shown at block 510. Subsequently, the aircraft (AC) angular rate and aircraft angular acceleration are obtained, as shown at block 512.

EXAMPLES AND SIMULATIONS

Using the above techniques, simulations were executed and compared with outputs from a second EGI used to simulate outputs expected from a degimbalized EGI. For example, both the simulator EGI and the degimbalized EGI were positioned on a motion table. The normal and degimbalized outputs were recorded as the table was rolled side-to-side. Expected "benchmark" results were obtained due to a high-quality of the angular data from the gimbal-simulator EGI.

The testing done in the lab is expected to be reasonably close to dynamics in the real system. In this example, only one gimbal angle (roll) was varied; however the algorithm is structured to handle all three axes if needed. Results of the simulations are illustrated in FIGS. 6-9.

Figure 6:
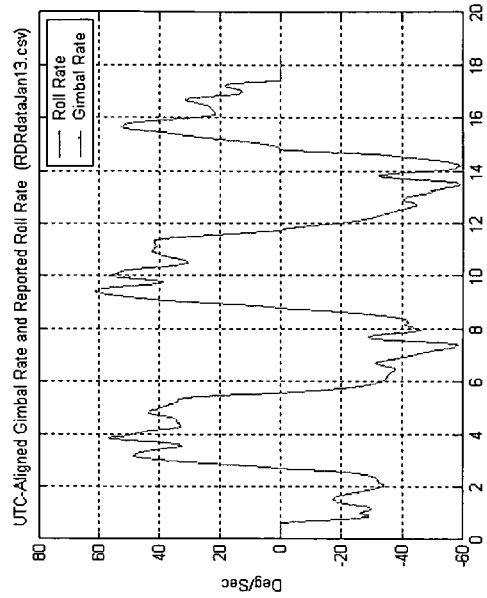
FIGS. 6-9 illustrate results of example simulations of removing effects of gimbal motion within EGI outputs.

FIG. 6 illustrates the UTC-aligned gimbal angle and the reported roll angle. As shown, the time-aligned gimbal angle almost perfectly overlays the EGI measured roll angle.

Figure 7:
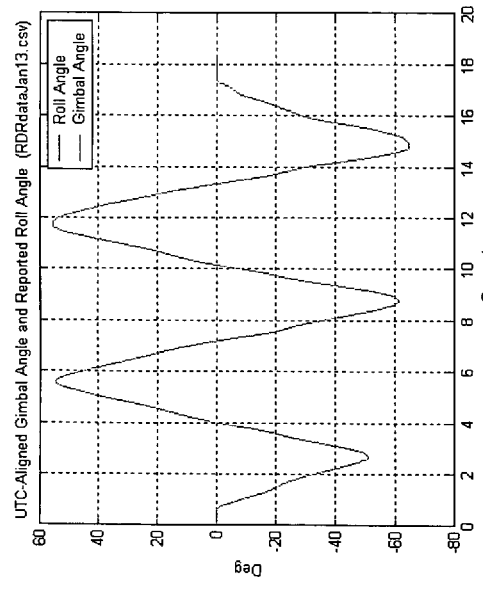

FIG. 7 illustrates the UTC-aligned gimbal rate and the reported roll rate. As shown, the time-aligned gimbal angle rate also almost perfectly overlays the EGI measured roll rate.

Figure 8:
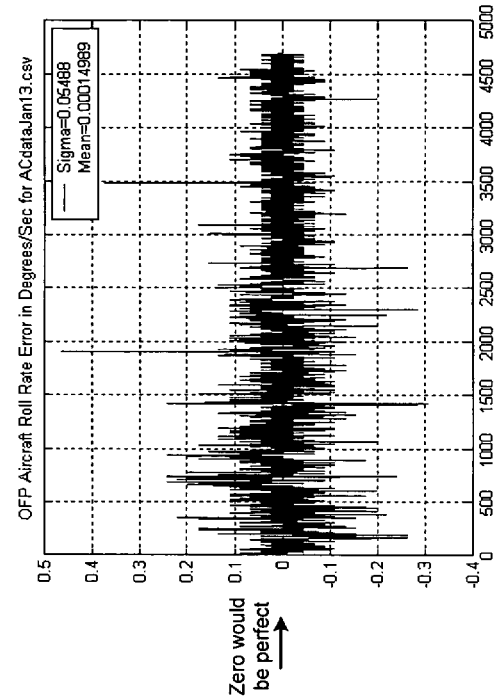

FIG. 8 illustrates an error plot of the degimbalized aircraft roll angle. A plot of zero would indicate no error, and thus the small deviation from zero indicates good test results.

Figure 9:
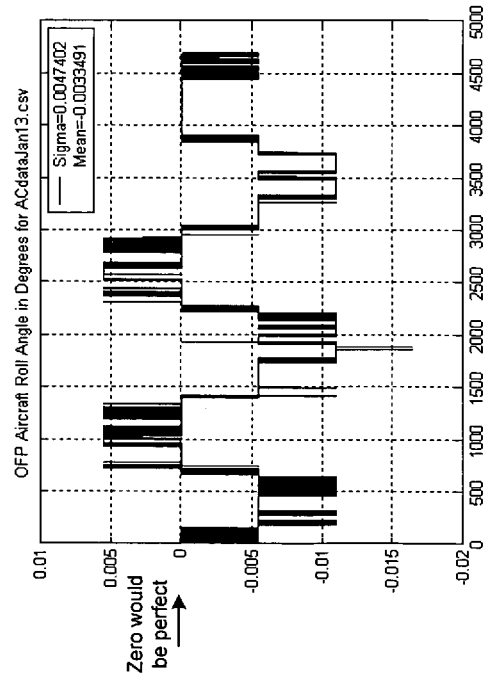

FIG. 9 illustrates an error plot of the aircraft roll rate in degrees. As shown, the error was minimal for a large number of samples.

Within embodiments described above, a method and system for degimbalization of outputs from sensors mounted on a gimbal within a moving aircraft. Of course, however, the described method can be used to process outputs from sensors mounted on any kind of moving platform, in order to determine both sensor object and platform navigation information.

It is intended that the foregoing detailed description be regarded as illustrative rather than limiting, and it is intended to be understood that the following claims including all equivalents define the scope of the invention.

What is claimed is:

1. A method comprising:
receiving data from an inertial sensor mounted on a gimbal assembly that is positioned within a moving vehicle, wherein motion of the inertial sensor is due to motion of the gimbal assembly and motion of the moving vehicle, and wherein data output from the inertial sensor reflects the motion of the gimbal assembly and the motion of the moving vehicle;
receiving time-of-validity data for the inertial sensor data; and
removing effects of the motion of the gimbal assembly from the inertial sensor data to produce data approximately reflecting motion of the moving vehicle.

2. The method of claim 1, further comprising receiving data from an angular sensor that indicates an angular offset of the gimbal assembly with respect to the moving vehicle and corresponding time-of-validity data.

3. The method of claim 2, further comprising time synchronizing the data received from the inertial sensor and the data received from the angular sensor.

4. The method of claim 3, wherein removing effects of the motion of the gimbal assembly from the data to produce data approximately reflecting motion of the moving vehicle comprises applying a linear least squares curve fit to the data from the angular sensor to extrapolate an angular offset of the gimbal assembly at a time-of-validity for corresponding inertial sensor data.

5. The method of claim 4, further comprising determining an estimate of a gimbal angle rate data from a slope of the least squares curve fit.

6. The method of claim 5, further comprising applying a linear least squares curve fit to the gimbal angle rate data to extrapolate gimbal rate data at a time-of-validity for corresponding inertial sensor data.

7. The method of claim 1, wherein removing the effects of the motion of the gimbal assembly from the data to produce data approximately reflecting the motion of the moving vehicle comprises transforming the data from a frame of reference with respect to the gimbal into a frame of reference with respect to the moving vehicle.

8. The method of claim 7, wherein transforming the data from a frame of reference with respect to the gimbal into a frame of reference with respect to the moving vehicle comprises using direction cosine matrices (DCM) to transform the data having a first set of x,y,z axes to a second set of x,y,z axes.

9. The method of claim 8, wherein using the DCM to transform the data comprises:
multiplying a mathematical transformation that rotates axes of the inertial sensor to coincide with axes of the gimbal assembly by a mathematical transformation that rotates the axes of the gimbal assembly to coincide with axes of the moving vehicle to determine a mathematical transformation that rotates the axes of the inertial sensor to coincide with the axes of the moving vehicle.

10. The method of claim 9, wherein using the DCM to transform the data comprises:
multiplying the mathematical transformation that rotates the axes of the inertial sensor to coincide with the axes of the moving vehicle by a mathematical transformation that rotates axes of a local level navigation frame to coincide with the axes of the inertial sensor to determine a mathematical transformation that rotates the axes of a local level navigation frame to coincide with the axes of the moving vehicle.

11. The method of claim 10, further comprising determining an attitude of the moving vehicle within a frame of reference of the moving vehicle from the data output from the inertial sensor using the mathematical transformation that rotates the axes of a local level navigation frame to coincide with the axes of the moving vehicle.

12. A method for transforming gimbaled data output from an inertial sensor positioned on a gimbaled assembly within a moving vehicle into a frame of reference with respect to the moving vehicle, the method comprising:
receiving data output from the inertial sensor positioned on the gimbaled assembly, wherein the data reflects motion of the gimbaled assembly and motion of the moving vehicle;
receiving data output from an angular sensor that indicates an angular offset of the gimbaled assembly with respect to the moving vehicle;
synchronizing the data output from the inertial sensor and the data output from the angular sensor; and
removing effects of the motion of the gimbaled assembly from the data output from the inertial sensor to produce data approximately reflecting motion of the moving vehicle.

13. The method of claim 12, wherein removing the effects of the motion of the gimbaled assembly from the data output from the inertial sensor to produce data approximately reflecting motion of the moving vehicle comprises removing the angular offset of the gimbaled assembly from the data output from the inertial sensor.

14. The method of claim 12, wherein removing the effects of the motion of the gimbaled assembly from the data output from the inertial sensor to produce data approximately reflecting motion of the moving vehicle comprises transforming the data output from the inertial sensor from a frame of reference with respect to the gimbal into a frame of reference with respect to the moving vehicle.

15. A sensing device assembly comprising:
a sensing device mounted on a gimbaled assembly;

an Embedded Global Positioning System/Inertial Navigation System (EGI) mounted on the gimbaled assembly to provide data in a gimbaled frame of reference to the sensing device;

a gimbaled assembly angle sensor to provide outputs that indicate an angular offset of the gimbaled assembly; and a processor for (i) receiving the data in the gimbaled frame of reference from the EGI and the outputs from the gimbaled assembly angle sensor, (ii) synchronizing the outputs from the EGI and the outputs from the gimbaled assembly angle sensor, and (iii) subtracting the outputs from the gimbaled assembly angle sensor from the outputs of the EGI.

16. The sensing device assembly of claim 15, wherein the sensing device is a Synthetic Aperture Radar (SAR).

17. The sensing device assembly of claim 15, wherein the EGI includes inertial sensors selected from the group consisting of gyroscopes and accelerometers.

18. The sensing device assembly of claim 15, wherein the processor applies a linear least squares curve fit to the data from the gimbaled assembly angle sensor to extrapolate an angular offset of the gimbaled assembly at a time-of-validity for corresponding EGI data.

19. The sensing device assembly of claim 18, wherein the processor removes effects of motion of the gimbaled assembly from the EGI data using the angular offset of the gimbaled assembly.

* * * * *